(12) United States Patent
Miyoshi

(10) Patent No.: US 10,819,909 B2
(45) Date of Patent: Oct. 27, 2020

(54) DRIVING APPARATUS CAPABLE OF SATISFACTORILY DETECTING POSITION OF MOVABLE UNIT AND ENSURING LARGE DRIVING THRUST, IMAGE BLUR CORRECTION APPARATUS, AND IMAGE PICKUP APPARATUS

(71) Applicant: CANON KABUSHIKI KAISHA, Tokyo (JP)

(72) Inventor: Kaori Miyoshi, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/377,380

(22) Filed: Apr. 8, 2019

(65) Prior Publication Data

US 2019/0320119 A1    Oct. 17, 2019

(30) Foreign Application Priority Data

Apr. 11, 2018    (JP) .................................. 2018-076275

(51) Int. Cl.
*H04N 5/232*    (2006.01)
*G01D 5/14*    (2006.01)

(52) U.S. Cl.
CPC ......... *H04N 5/23287* (2013.01); *G01D 5/145* (2013.01)

(58) Field of Classification Search
CPC ........... H04N 5/23248; H04N 5/23265; H04N 5/2328; H04N 5/23287
USPC .................. 348/208.99, 208.4, 208.7, 208.11
See application file for complete search history.

(56) References Cited

U.S. PATENT DOCUMENTS

| 6,822,441 B1* | 11/2004 | Moreno | G01D 5/145 |
| | | | 324/207.25 |
| 2003/0048101 A1* | 3/2003 | Tola | G01D 5/145 |
| | | | 324/207.25 |
| 2009/0153134 A1* | 6/2009 | Matsumoto | G03B 5/00 |
| | | | 324/207.11 |
| 2011/0080162 A1* | 4/2011 | Steinich | G01D 5/145 |
| | | | 324/207.25 |
| 2017/0155847 A1* | 6/2017 | Ito | H04N 5/23287 |

(Continued)

FOREIGN PATENT DOCUMENTS

| JP | 2007219338 A | 8/2007 |
| JP | 2013246134 A | * 12/2013 |
| JP | 2013246134 A | 12/2013 |

(Continued)

*Primary Examiner* — Anthony J Daniels
(74) *Attorney, Agent, or Firm* — Rossi, Kimms & McDowell LLP

(57) ABSTRACT

A driving apparatus which is capable of detecting a position with a long stroke and ensuring large driving thrust. The driving apparatus has a fixed member, a movable member, a coil, a position detector that detects a position of the movable member, and a first magnet unit and a second magnet unit that are placed with the coil interposed therebetween. The position detector and the coil are placed on one of the fixed member and the movable member, and the first magnet unit and the second magnet unit are placed on the other one. The second magnet unit has a concave portion in a central part of a surface facing the position detector. The position detector is placed closer to the second magnet unit than to the first magnet unit.

16 Claims, 13 Drawing Sheets

(56) References Cited

U.S. PATENT DOCUMENTS

2018/0115715 A1* 4/2018 Jung .................... H04N 5/2254

FOREIGN PATENT DOCUMENTS

| JP | 2017111183 A | 6/2017 |
| JP | 6172993 B2 | 8/2017 |

* cited by examiner

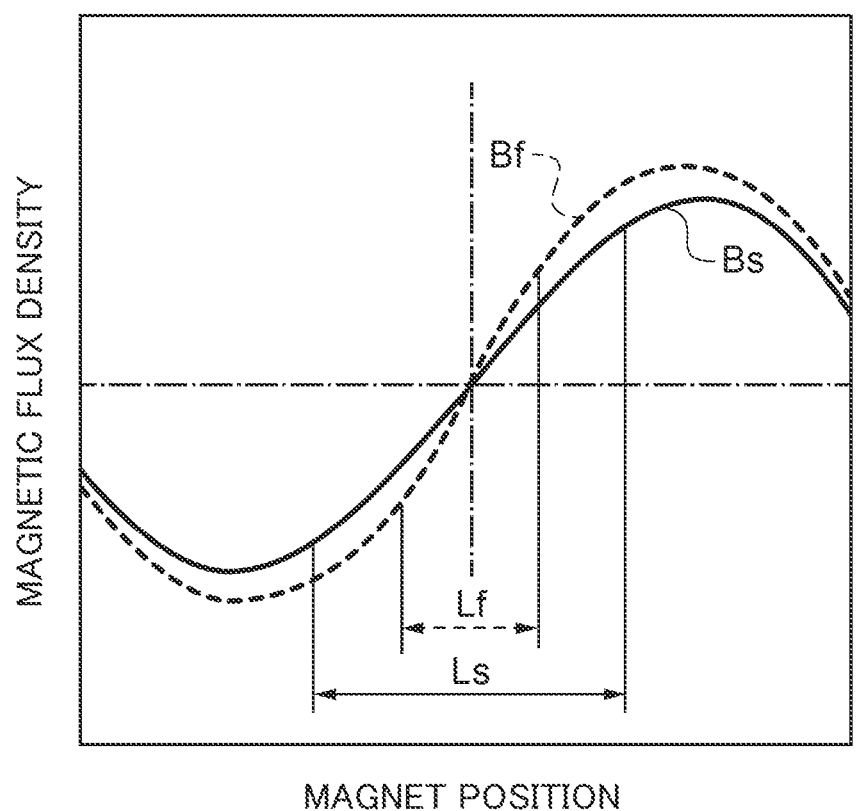

DRIVING APPARATUS CAPABLE OF SATISFACTORILY DETECTING POSITION OF MOVABLE UNIT AND ENSURING LARGE DRIVING THRUST, IMAGE BLUR CORRECTION APPARATUS, AND IMAGE PICKUP APPARATUS

BACKGROUND OF THE INVENTION

Field of the Invention

The present invention relates to a driving apparatus, an image blur correction apparatus, and an image pickup apparatus, and in particular to a driving apparatus that has a magnet and a magnetic sensor, which move relatively to each other, and passes electric current through the coil to move the magnet and the coil relatively to each other, an image blur correction apparatus equipped with the driving apparatus, and an image pickup apparatus.

Description of the Related Art

In recent years, due to increased performance of an image pickup apparatus, there has been a demand for a driving apparatus capable of accurately moving optical components, which constitute the image pickup apparatus, with a long stroke. Optical components to be moved tend to be increased in weight due to upsizing, and hence there is a demand for a driving apparatus that is compact and has lame thrust. Here, the driving apparatus in the image pickup apparatus is a zooming apparatus, a focusing apparatus, an image blur correction apparatus, or the like. For example, a method using a voice coil motor is used for many image blur correction apparatuses that move an optical component in a direction perpendicular to an optical axis to reduce image blur caused by camera shake when an image is taken. In the method using the voice coil motor, a coil is placed in one of a movable unit and a fixed unit, and a magnet is placed in the other one. Electric current is passed through the coil to move the magnet and the coil relatively to each other.

An image blur correction apparatus with a magnet designed to increase driving thrust is disclosed in Japanese Laid-Open Patent Publication (Kokai) No. 2017-111183 and Japanese Patent No. 6172993. Japanese Laid-Open Patent Publication (Kokai) No. 2017-111183 discloses an arrangement in which a part of a magnet array called a Halbach array is used so as to effectively increase the density of a magnetic flux crossing a coil. Japanese Patent No. 6172993 discloses an arrangement in which magnets are placed above and below a coil so as to effectively increase the density of a magnetic flux crossing the coil.

To move the movable unit with high accuracy, a stroke of the movable unit, that is, a position of the movable unit is detected in many cases. To detect a position of the movable unit, for example, there is a magnetic position detecting method that detects relative positions of a magnet and a magnetic sensor by the magnetic sensor, such as a Hall effect device or an MR (magnetic resistance) device, outputting an electric signal corresponding to a change in magnetic flux density with relative movement of the magnet and the magnetic sensor. In the magnetic position detecting method, in general, relative positions of the magnet and the magnetic sensor are calculated based on the assumption that a magnetic flux density detectable by the magnetic sensor varies linearly with relative movement of the magnetic sensor and the magnet.

Japanese Laid-Open Patent Publication (Kokai) No. 2007-219338 discloses an image blur correction apparatus with an arrangement in which a magnet used for detecting a position of the movable unit is used as a driving apparatus as well. Japanese Laid-Open Patent Publication (Kokai) No. 2013-246134 discloses a position detecting apparatus that ensures a long position detecting stroke by cutting a notch in a magnet or dividing the magnet into two.

According to the technique disclosed in Japanese Laid-Open Patent Publication (Kokai) No. 2007-219338, however, a magnetic flux density detected by the magnetic sensor varies like a curve Bf in FIG. 13, and hence in a case where only positions in an area of the curve Bf which varies linearly are detectable, a detectable stroke is limited to approximately 1 mm (±0.5 mm). Thus, uses for the technique disclosed in Japanese Laid-Open Patent Publication (Kokai) No. 2007-219338 are limited to cases where the stroke of the movable unit is short.

To increase the detectable stroke, an arrangement using a magnet for driving the movable unit and a magnet for position detection should be used as disclosed in Japanese Laid-Open Patent Publication (Kokai) No. 2017-111183 and Japanese Patent No. 6172993. However, even in the arrangement using magnets arranged in a Halbach array disclosed in Japanese Laid-Open Patent Publication (Kokai) No. 2017-111183, the detectable stroke is approximately 2 mm as indicated by a curve Bb in FIG. 13. In the arrangement disclosed in Japanese Patent No. 6172993, the magnets are placed above and below the coil, and an additional magnet for position detection is also needed, resulting an increase in the number of components and making it difficult to save space. On the other hand, a position detector disclosed in Japanese Laid-Open Patent Publication (Kokai) No. 2013-246134 has a problem that in a case where it is applied to a driving apparatus, large driving thrust cannot be ensured due to a small volume of the magnet.

SUMMARY OF THE INVENTION

The present invention provides a driving apparatus which has a long position detecting stroke and is capable of ensuring large driving thrust, an image blur correction apparatus, and an image pickup apparatus.

Accordingly, the present invention provides a driving apparatus comprising a fixed member, a movable member, a coil, a position detector configured to detect a position of the movable member, and a first magnet unit and a second magnet unit configured to be placed with the coil interposed therebetween, wherein the position detector and the coil are placed on one of the fixed member and the movable member, and the first magnet unit and the second magnet unit are placed on the other one of the fixed member and the movable member, the second magnet unit has a concave portion in a central part of a surface facing the position detector, and the position detector is placed closer to the second magnet unit than to the first magnet unit.

According to the present invention, the driving apparatus has a long position detecting stroke and is capable of ensuring large driving thrust.

Further features of the present invention will become apparent from the following description of exemplary embodiments with reference to the attached drawings.

BRIEF DESCRIPTION OF THE DRAWINGS

FIG. 11 is a graph useful in explaining a relationship between magnet positions and magnetic flux densities in the image blur correction apparatus according to the third embodiment.

DESCRIPTION OF THE EMBODIMENTS

The present invention will now be described in detail with reference to the accompanying drawings showing embodiments thereof. Here, an arrangement of a driving apparatus according to the present invention, which is embodied as an image blur correction apparatus provided in an image pickup apparatus, will be described.

Figure 1A:
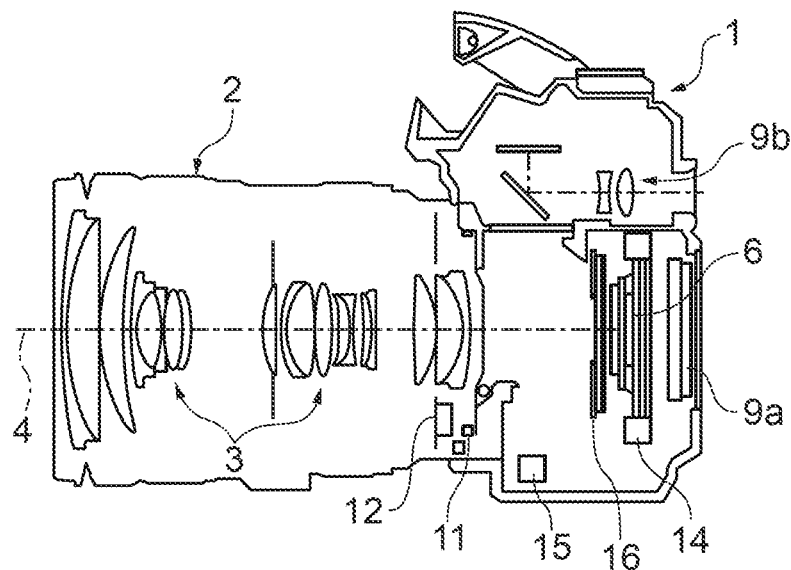
FIGS. 1A and 1B are views useful in explaining an arrangement of an image pickup apparatus according to an embodiment of the present invention.
Figure 1B:
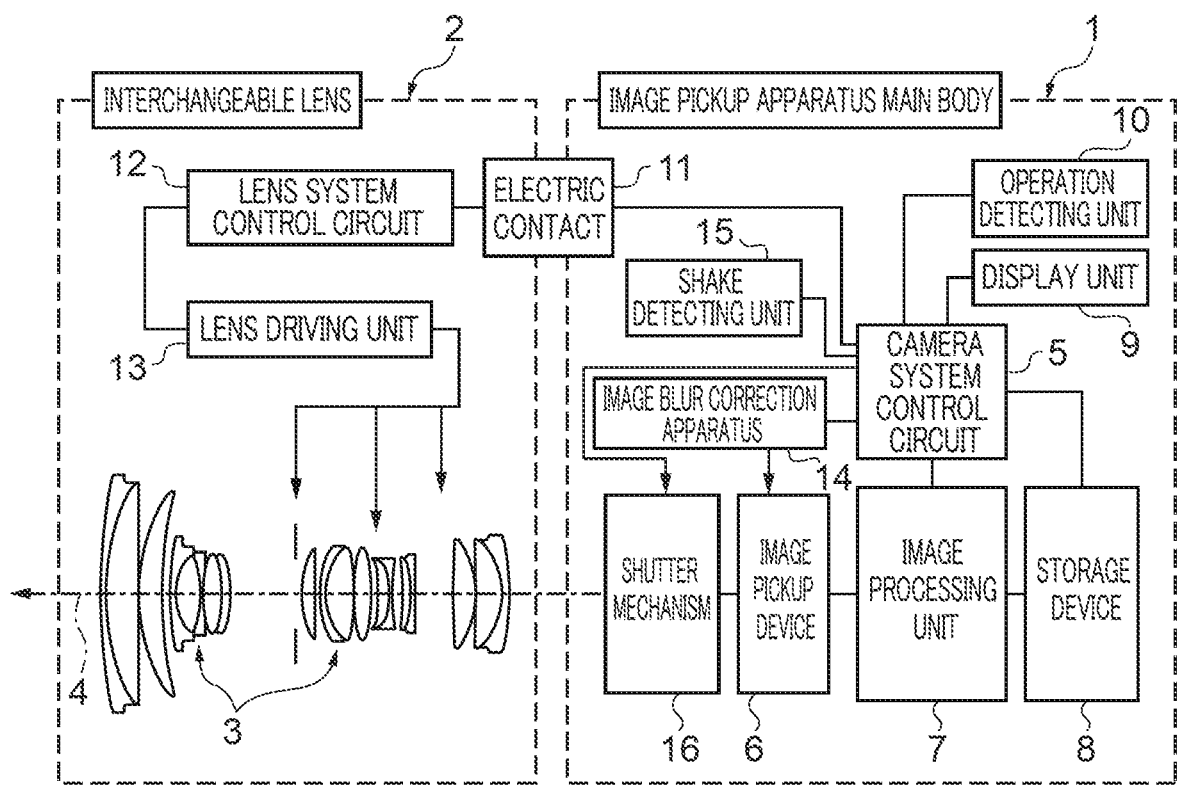

FIG. 1A is a middle-cross-sectional view schematically showing an arrangement of the image pickup apparatus equipped with the image blur correction apparatus according to an embodiment of the present invention. FIG. 1B is a block diagram showing an electrical arrangement of the image pickup apparatus. The image pickup apparatus has an image pickup apparatus main body 1 and an interchangeable lens 2 removable from the image pickup apparatus main body 1. The image pickup apparatus main body 1 has a camera system control circuit 5, an image pickup device 6, an image processing unit 7, a storage device 8, a display unit 9, an operation detecting unit 10, the image blur correction apparatus 14, a shake detecting unit 15, and a shutter mechanism 16. The display unit 9 includes an in-finder display device 9a and a back display panel 9b. The interchangeable lens 2 has a lens group 3, a lens system control circuit 12, and a lens driving unit 13. With the interchangeable lens 2 mounted on the image pickup apparatus main body 1, the camera system control circuit 5 and the lens system control circuit 12 are connected together via an electrical contact 11 so that they can communicate with each other.

The shake detecting unit 15 is, for example, a gyro sensor. The shake detecting unit 15 detects shakes of the image pickup apparatus in three axial directions i.e. a direction of an imaging optical axis 4 (hereafter referred to as "the optical axis direction") and a first direction and a second direction perpendicular to each other within a plane perpendicular to the imaging optical axis 4, and sends a signal indicating amounts of shake to the camera system control circuit 5. Based on the signal obtained from the shake detecting unit 15, the camera system control circuit 5 computes a target position of the image pickup device 6 for reducing blurring of a subject image, calculates a driving amount within a plane perpendicular to the imaging optical axis 4 for moving the image pickup device 6 to the target position, and sends the driving amount as a control signal to the image blur correction apparatus 14. The image blur correction apparatus 14 is a mechanism that moves the image pickup device 6 in a direction substantially perpendicular to the imaging optical axis 4 (a direction substantially parallel to an image forming surface of the image pickup device 6), or rotates the image pickup device 6 around the imaging optical axis 4. The image blur correction apparatus 14 moves the image pickup device 6 to the target position in the direction perpendicular to the imaging optical axis 4 by controlling passage of current through a coil 205, to be described later, in accordance with the driving amount (control signal) received from the camera system control circuit 5. This reduces (corrects for) image blurring caused by camera shake by a user or the like. It should be noted that among components constituting the image pickup apparatus, components which are not directly related to image blur correction may have well-known arrangements, and hence detailed description thereof is omitted.

Figure 2:
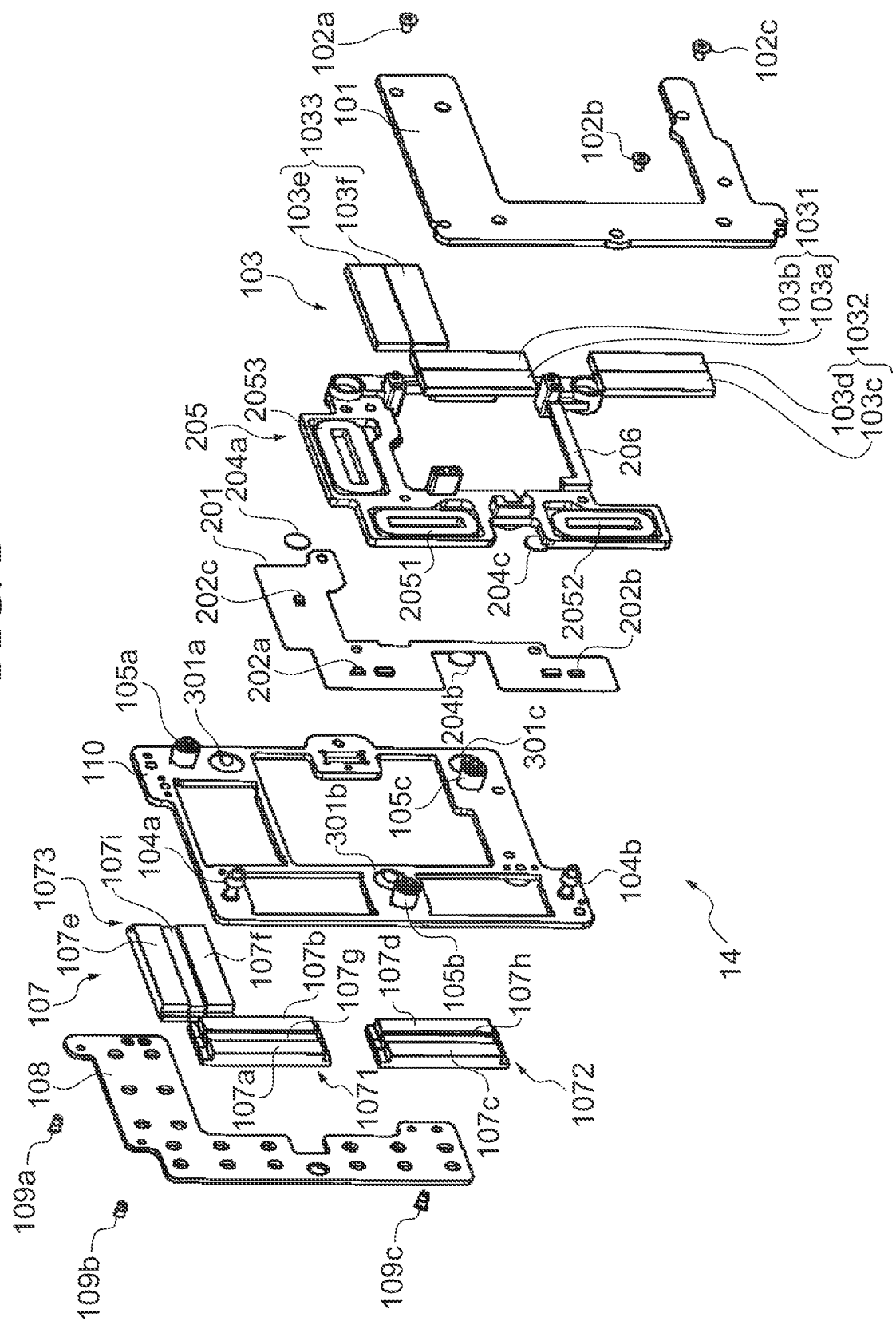
FIG. 2 is an exploded perspective view of an image blur correction apparatus according to a first embodiment, which the image pickup apparatus has.

FIG. 2 is an exploded perspective view of the image blur correction apparatus 14. Only components are described here, and their functions will be described later. The image blur correction apparatus 14 has an upper yoke 101, a screws 102a, 102b, and 102c, an upper magnet group 103 (first magnet unit), auxiliary spacers 104a and 104b, main spacers 105a, 105b, and 105c, a lower magnet group 107 (second magnet unit), and a lower yoke 108. The image blur correction apparatus 14 also has stepped screws 109a, 109b, and 109c, a base plate 110, an FPC 201, movable unit rolling plates 204a, 204b, and 204c, a coil 205, a movable frame 206, and balls 301a, 301b, and 301c.

The upper magnet group 103 has a first upper magnet unit 1031, a second upper magnet unit 1032, and a third upper magnet unit 1033. The first upper magnet unit 1031 has upper magnets 103a and 103b, the second upper magnet unit 1032 has upper magnets 103c and 103d, and the third upper magnet unit 1033 has upper magnets 103e and 103f. The lower magnet group 107 has a first lower magnet unit 1071, a second lower magnet unit 1072, and a third lower magnet unit 1073. The first lower magnet unit 1071 is configured to have three lower magnets 107a, 107g, and 107b which are arranged in this order in one direction. Similarly, the second lower magnet unit 1072 has three lower magnets 107c, 107h, and 107d, and the third lower magnet unit 1073 has three lower magnets 107e, 107i, and 107f. The FPC 201 is a flexible printed circuit and has position detecting elements 202a, 202b, and 202c, which are position detectors, mounted thereon. The coil 205 has a first coil 2051, a second coil 2052, and a third coil 2053.

It should be noted that among these members, the members denoted by numbers 100 to 199 are fixed members which are fixed at predetermined locations and do not move, and the members denoted by numbers 200 to 299 are movable members which are movable with respect to the fixed members.

Figure 3A:
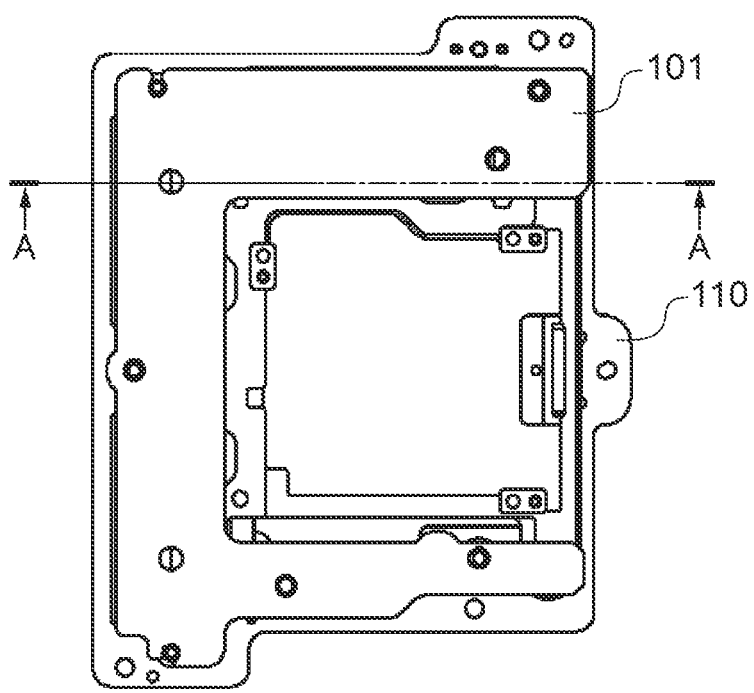
FIGS. 3A and 3B are a front view and a cross-sectional view, respectively, useful in explaining an arrangement of the image blur correction apparatus according to the first embodiment.
Figure 3B:
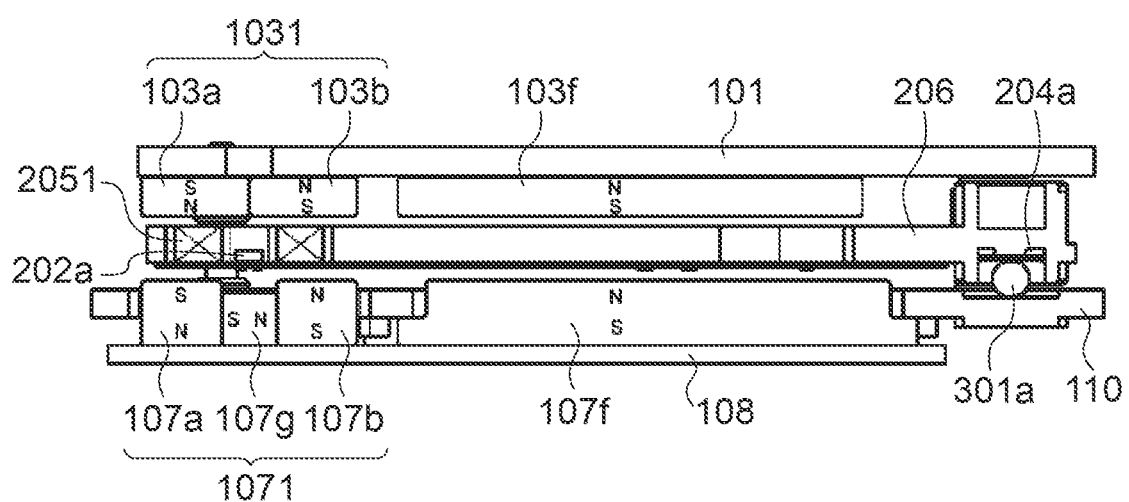

Next, referring to FIGS. 2, 3A, and 3B, a description will be given of members constituting the image blur correction apparatus 14. FIG. 3A is a front view of the image blur correction apparatus 14 (as seen from a subject side in the optical axis direction). FIG. 3B is a cross-sectional view taken along an arrow A-A in FIG. 3A. The upper yoke 101, the upper magnet group 103, the lower magnet group 107, and the lower yoke 108 form a magnetic circuit, which is what is called a closed magnetic path. This magnetic circuit formed as the closed magnetic path is comprised of three magnetic circuits consisting of a first magnetic circuit, a second magnetic circuit, and a third magnetic circuit. The first magnetic circuit is comprised of the first upper magnetic unit 1031 and the first lower magnetic unit 1071, the second magnetic circuit is comprised of the second upper magnetic unit 1032 and the second lower magnetic unit 1072, and the third magnetic circuit is comprised of the third upper magnetic unit 1033 and the third lower magnetic unit 1073.

Each of the upper magnets 103a, 103b, 103b, 103c, 103d, 103e, and 103f and the upper yoke 101 are attracted to each other by magnetic force, and the upper magnets 103a, 103b, 103b, 103c, 103d, 103e, and 103f are adhered and fixed to the upper yoke 101. The lower magnets 107a, 107b, 107c, 107d, 107e, 107f, 107g, 107h, and 107i have flange portions in a longitudinal direction like the lower magnet 107f in FIG. 3B, and are fixed by the flange portions being sandwiched between the base plate 110 and the lower yoke 108. The upper magnets 103a, 103b, 103c, 103d, 103e, and 103f and the lower magnets 107a, 107b, 107c, 107d, 107e, and 107f are each magnetized in the optical axis direction (a vertical direction in FIG. 3B). The lower magnets 107g, 107h, and 107i are magnetized in a direction toward adjacent magnets (the direction perpendicular to the imaging optical axis 4).

In the upper magnet group 103, those adjacent to each other like the upper magnet 103a and the upper magnet 103b are magnetized in different directions. Those facing each other in the optical axis direction like the upper magnet 103a and the lower magnet 107a are magnetized in the same direction in the optical axis direction. In the lower magnet group 107, the lower magnet 107g is placed in a manner being sandwiched between the lower magnets 107a and 107b magnetized in the optical axis direction. In the similar manner, the lower magnet 107h is placed between the lower magnets 107c and 107d, and the lower magnet 107i is placed between the lower magnets 107e and 107f. This layout of the lower magnet group 107 enables generation of a high magnetic flux density between the upper yoke 101 and the lower yoke 108 in the optical axis direction.

It should be noted that the first lower magnet unit 1071, the second lower magnet unit 1072, and the third lower magnet unit 1073 are each configured to form a part of a Halbach array. Improving efficiency of a magnetic circuit using this arrangement is a well-known principle, and hence description thereof is omitted here. The height of the lower magnets 107g, 107h, and 107i in the optical axis direction is lower than that of the lower magnets 107a, 107b, 107c, 107d, 107e, and 107f in the optical axis direction, and the reason why this arrangement is used will be described later.

A strong attractive force is generated between the upper yoke 101 and the lower yoke 108, and hence the main spacers 105a, 105b, and 105c and the auxiliary spacers 104a and 104b are configured to hold a proper clearance between the upper yoke 101 and the lower yoke 108. The proper clearance here is such a clearance as to place the coil 205 and the FPC 201 between the upper magnet group 103 and the lower magnet group 107 and ensure a predetermined gap between them. Screw holes are formed in the main spacers 105a, 105b, and 105c, and the upper yoke 101 is fixed to the main spacers 105a, 105b, and 105c with the screws 102a, 102b, and 102c.

Rubber is provided on barrels of the main spacers 105a, 105b, and 105c to form mechanical ends (what is called stoppers) of the movable unit. The base plate 110 and the lower yoke 108 are fastened together with the stepped screws 109a, 109b, and 109c. The lower magnets 107a, 107b, 107c, 107d, 107e, and 107f have a greater thickness than that of the base plate 110 and thus they are fixed in such a manner as to project from (extend off) the base plate 110. The movable frame 206, which is formed by a magnesium die casting, an aluminum die casting, or the like, is lightweight and has high stiffness. The movable unit is formed by fixing the movable members (the members denoted by the numbers 200 to 299) to the movable frame 206. The image pickup device 6 is directly or indirectly mounted on the movable frame 206 and moves integrally with the movable frame 206.

The position detectors 202a, 202b, and 202c are mounted on the FPC 201 placed on the lower magnet group 107 side of the movable frame 206. For example, Hall effect devices are used as the position detectors 202a, 202b, and 202c so as to detect positions by using the magnetic circuit described above. In general, the Hall effect devices are small, and hence they can be nested inside windings of the first coil 2051, the second coil 2052, and the third coil 2053. Thus, magnet flux detecting positions are closer to the lower magnet group 107 than to the upper magnet group 103. Namely, the distance between the position detectors 202a, 202b, and 202c and the lower magnet group 107 is shorter than the distance between the position detectors 202a, 202b, and 202c and the upper magnet group 103. The reason why this arrangement is used will be described later.

Connectors for electrically connecting the image pickup device 6 (not shown in FIG. 3A or 3B) and the first coil 2051, the second coil 2052, and the third coil 2053 together are mounted on the FPC 201. Namely, the FPC 201 plays a role in electrically connecting the camera control circuit 5 and the image pickup device 6 and the image blur correction apparatus 14 together. The movable unit rolling plates 204a, 204b, and 204c are fixed to the movable frame 206 by bonding and form rolling surfaces of the balls 301a, 301b, and 301c. The use of the movable unit rolling plates 204a, 204b, and 204c makes it possible to design the balls 301a, 301b, and 301c with desired surface roughness, hardness, and so forth.

In the image blur correction apparatus 14, when electric current is passed through the coil 205, a force is generated according to Fleming's left-hand rule, enabling the movable unit to move with respect to the fixed unit. One coil 205 is inserted into each of the first to third magnetic circuits to form driving units, which can be run independently of one another. On this occasion, feedback control based on output signals (Hall effect device signals) from the position detectors 202a, 202b, and 202c enables the movable unit to move in the direction perpendicular to the optical axis with high accuracy and also rotate around the optical axis. It should be noted that to rotate the movable unit around the optical axis, control should be provided such that values of output signals from the position detectors 202a and 202b are in opposite phase. The image blur correction apparatus 14 can be drivingly controlled using a well-known control method, and hence further explanation thereof is omitted.

Figure 4A:
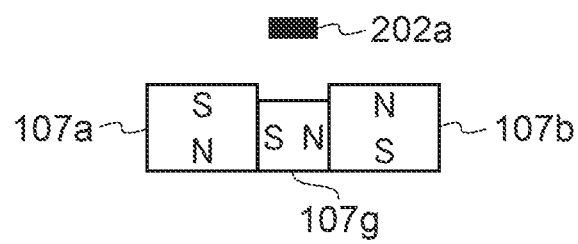
FIGS. 4A to 4C are views useful in explaining a positional relationship between a position detector and a lower magnet in the image blur correction apparatus according to the first embodiment.

Next, a description will be given of a position detecting stroke in the image blur correction apparatus 14. FIG. 4A is a view useful in explaining a positional relationship between the position detector 202a and the first lower magnet unit 1071. It should be noted that a positional relationship between the position detector 202b and the second lower magnet unit 1072, and a positional relationship between the position detector 202c and the third lower magnet unit 1073 are the same as the one shown in FIG. 4A, and hence illustration and description thereof are omitted.

Figure 4B:
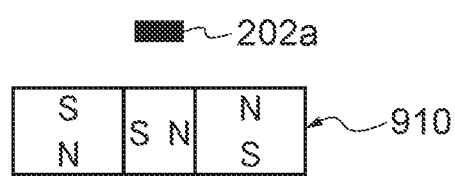
Figure 5:
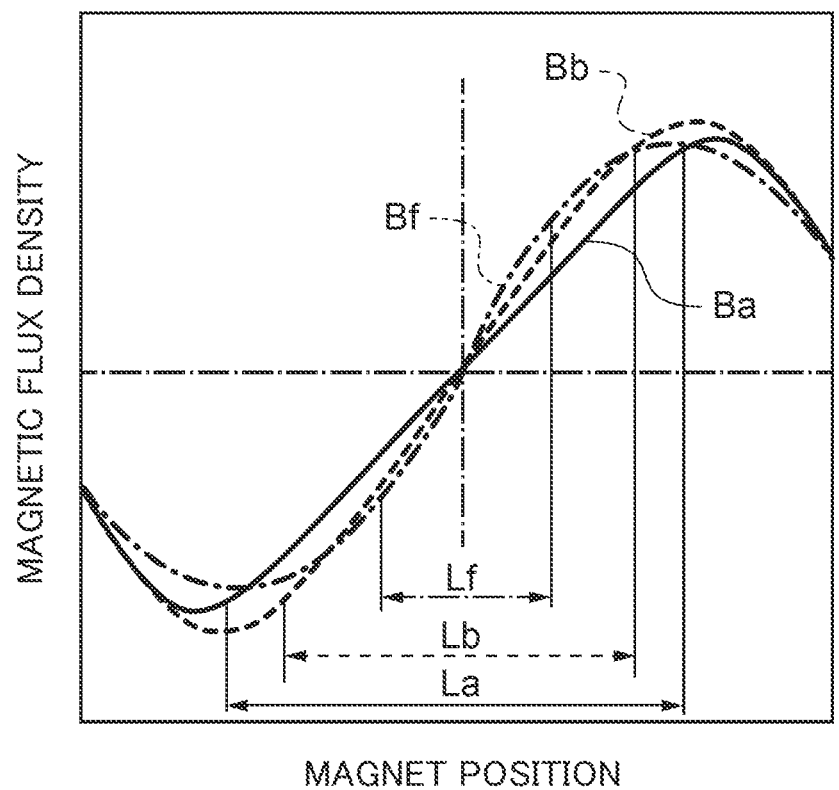
FIG. 5 is a graph useful in explaining a relationship between magnet positions and magnetic flux densities in the image blur correction apparatus according to the first embodiment.

In the first lower magnet unit 1071 of the image blur correction apparatus 14, the height of the central lower magnet 107g is lower than that of the two lower magnets 107a and 107b positioned at both ends, so as to form a concave portion in a central part of a surface which faces the position detector 202a. Among the three magnets, the central lower magnet 107g is magnetized in a direction crossing (here, perpendicular to) a direction in which the two lower magnets 107a and 107b are magnetized. Here, FIG. 4B shows an arrangement of a magnet unit 901, which is an example for comparison with the first magnet unit 1071. Three magnets of the magnet 910 which correspond to the lower magnets 107a, 107b, and 107g have the same height. FIG. 5 is a graph useful in explaining how magnetic flux densities detected by the position detector 202a vary with magnet positions. A curve Ba in FIG. 5 represents variation in magnetic flux density with respect to positions of the first lower magnet unit 1071 (shown in FIG. 4A), and a curve Bb in FIG. 5 represents variation in magnetic flux density with respect to positions of the magnet 910 (shown in FIG. 4B). A linear area La of the curve Ba is a position detecting stroke in the arrangement shown in FIG. 4A, and likewise, a linear area Lb of the curve Bb is a position detecting stroke in the arrangement shown in FIG. 4B. When the area La and the area Lb are compared with each other, it is found that the area La is wider than the area Lb.

Figure 4C:
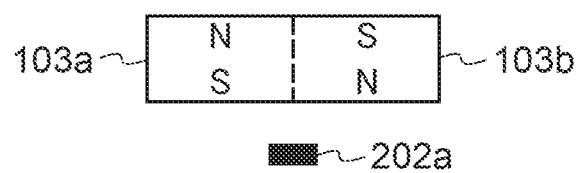

As shown in FIG. 3B, in the image blur correction apparatus 14, the position detector 202a is placed closer to the lower magnet group 107 than to the upper magnet group 103 in the direction in which the upper magnet group 103 and the lower magnet group 107 sandwich the first coil 2051. If this arrangement is reversed, that is, the position detector 202a is placed closer to the upper magnet group 103 than to the lower magnet group 107, the position detector 202a would detect a magnetic flux density from the upper magnet group 103. FIG. 4C is a view useful in explaining a positional relationship between the position detector 202a and the upper magnets 103a and 103b in a case where the position detector 202a detects a magnetic flux density from the upper magnet group 103. A curve Bf in FIG. 5 shows variation in magnetic flux density with respect to positions of the first upper magnet unit 1031 in the arrangement shown in FIG. 4C. An area Lf of the curve Bf in FIG. 5 in which the magnetic flux varies linearly is much narrower than the area La of the curve Ba. Namely, in a case where the distance between the position detector 202a and the magnets is constant, different arrangements of the magnets result in different variations in magnetic flux density detected by the position detector 202a, and as a result, also result in different position detecting strokes as well.

On the other hand, the magnetic flux density passing through the coil 205 has a large influence on driving thrust for driving the movable unit. In general, the higher the peak magnetic flux density and the greater the total amount of magnetic flux obtained by integrating a magnetic flux density curve, the greater the driving thrust is. As for the curves Ba, Bb, and Bf in FIG. 5, the integral of a magnetic flux density curve is large in the curve Bb or the curve Bf Namely, the integral of a magnetic flux density curve is greater in the magnet arrangement shown in FIGS. 4B and 4C, in which the entire part is at the same level, than in the magnet arrangement in FIG. 4A, in which the central part is at a lower level. Thus, in the image blur correction apparatus 14, the arrangement in FIG. 4C in which the magnetic flux density is high, that is, the arrangement in which the surface on the position detector 202a side is flat without any concave portion is adopted for the upper magnet group 103, and this ensures large driving thrust.

As described above, in the present embodiment, the position detectors 202a to 202c are placed on the side of the lower magnet group 107 comprised of the magnet unit having the concave portion in the central part thereof as shown in FIG. 4A. This enables the position detectors 202a to 202c to detect a magnetic flux density that linearly varies over a wide range, and this ensures a long position detecting stroke. Moreover, the upper magnet group 103 comprised of the flat magnet unit as shown in FIG. 4C which has high magnetic flux density is placed on the side away from the position detectors 202a to 202c. This ensures large driving thrust.

It should be noted that in the image blur correction apparatus 14, the first upper magnet unit 1031 is comprised of the two upper magnets 103a and 103b, and the second upper magnet unit 1032 and the third upper magnet unit 1033 have the same arrangement as that of the upper magnet unit 1031. This, however, is not limitative, but the first upper magnet unit 1031 may have a Halbach array comprised of three magnets a central one of which is at the same level as that of the other magnets (that is, the arrangement in FIG. 4B) like the first lower magnet unit 1071. As the first upper magnet unit 1031, one with an integral double-sided two-pole magnetization may be used in place of a unit comprised of two bodies like the first upper magnet unit 1031, and arrangements modified in various ways may be used as long as the same effects can be obtained.

Second Embodiment

An image blur correction apparatus according to a second embodiment differs from the image blur correction apparatus 14 according to the first embodiment only in structures of upper magnets used for an upper magnet group and lower magnets used for a lower magnet group. For this reason, a description will be given of only differences from the first embodiment.

Figure 6:
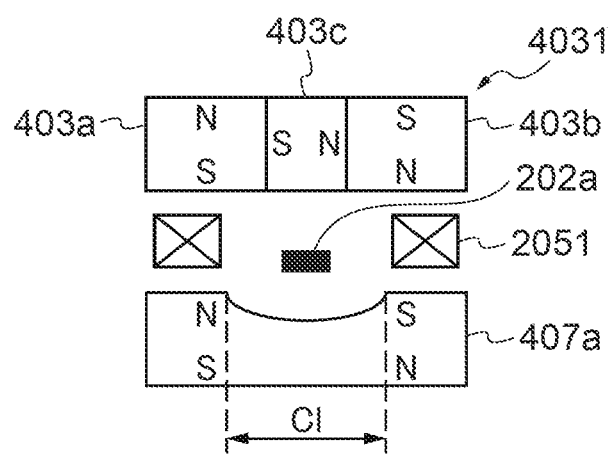
FIG. 6 is a view showing in a simplified manner a driving part in an image blur correction apparatus according to a second embodiment.

FIG. 6 is a view showing the arrangement of a first upper magnet unit 4031 and a lower magnet 407a, which is a first lower magnet unit, in the image blur correction apparatus according to the second embodiment as seen from the same viewpoint as in FIG. 4. It should be noted that in the second embodiment, the image blur correction apparatus also has three driving units, and as a typical example thereof, a driving part comprised of the first upper magnet unit 4031, the lower magnet 407a and a first coil 2051 is illustrated in FIG. 6, and illustration and description of the other driving units are omitted.

The first upper magnet unit 4031 has upper magnets 403a, 403b, and 403c. The lower magnet 407a has an arc-shaped concave portion in a central part of its face that faces the position detector 202a. The first coil 2051 mounted on the movable frame 206 (not shown in FIG. 6) is placed in a manner being sandwiched between the first upper magnet unit 4031 and the lower magnet 407a. The position detector 202a mounted on the FPC 201 (not shown in FIG. 6) placed on the lower magnet 407 side of the first coil 2051 detects a position of the movable frame 206 by detecting a change in the magnetic flux of the lower magnet 407a. The position detector 202a is placed at a location closer to the lower magnet 407a than to the first upper magnet unit 4031.

The upper yoke 101 (not shown in FIG. 6), the first upper magnet unit 4031, the lower magnet 407a, and the lower yoke 108 (not shown in FIG. 6) form a magnetic circuit which is a closed magnetic path. The upper magnets 403a and 403b are magnetized in different directions in the direction of the optical axis (a vertical direction in FIG. 6). The upper magnet 403c between the upper magnets 403a and 403b is magnetized in a direction toward the upper magnets 403a and 403b (a horizontal direction in FIG. 6). The first upper magnet unit 4031 thus has an arrangement imitating a part of a Halbach array in which the central one of the three magnets is magnetized in the direction crossing (here, perpendicular to) the direction in which the magnets at both ends are magnetized, and therefore magnetic flux efficiency for the first coil 2051 is enhanced.

In the lower magnet 407a, a part facing to the upper magnet 403a and a part facing to the upper magnet 403b have a double-sided two-pole magnetization in which they are magnetized in the opposite directions in the direction of the optical axis. An arc-shaped concave area Cl provided in the lower magnet 407a is designed to have a length equal to or greater than a length over which position detection is desired to be performed. Namely, where a stroke over which an output signal from the position detector 202a indicates linearity is "L", the following relationship holds, "Cl>L".

Figure 7A:
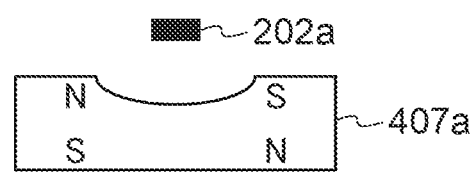
FIGS. 7A and 7B are views useful in explaining a positional relationship between a position detector and a lower magnet in the image blur correction apparatus according to the second embodiment.
Figure 7B:
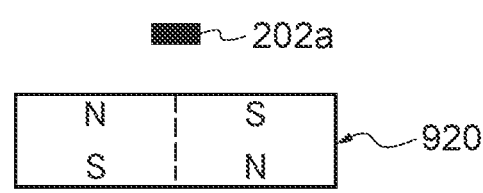
Figure 8:
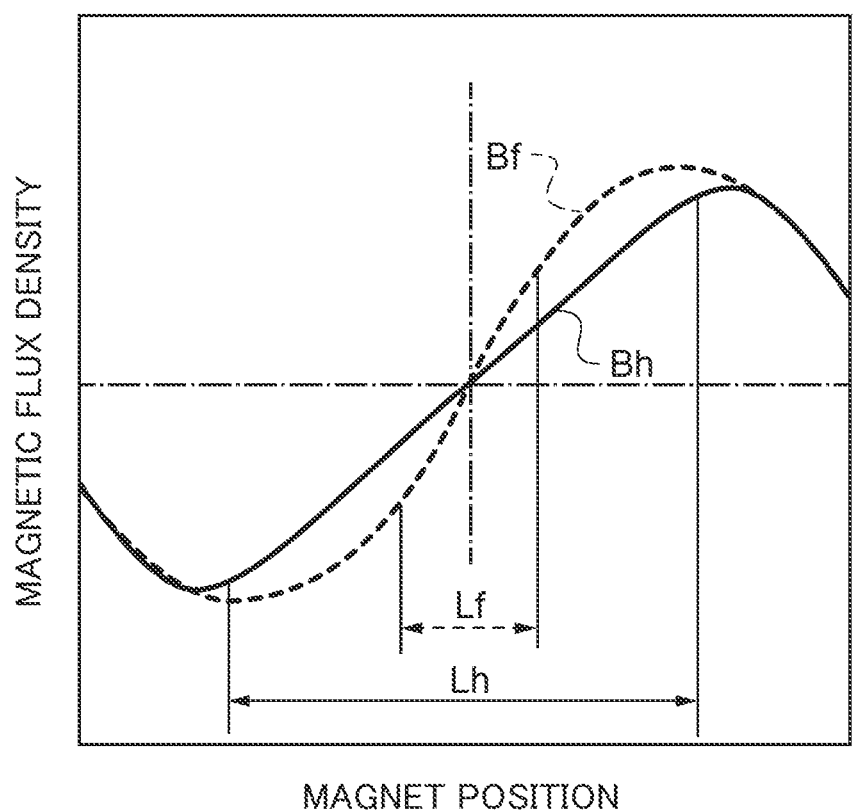
FIG. 8 is a graph useful in explaining a relationship between magnet positions and magnetic flux densities in the image blur correction apparatus according to the second embodiment.

FIG. 7A is a view useful in explaining a positional relationship between the position detector 202a and the lower magnet 407a. FIG. 7B is a view showing an arrangement using a magnet 920 which is an example for comparison to the lower magnet 407a. The magnet 920 is obtained by modifying the lower magnet 407a from one with the concave surface to one with a flat surface. FIG. 8 is a graph useful in explaining how magnetic flux densities detected by the position detector 202a vary with magnet positions. A curve Bh in FIG. 8 represents variation in magnetic flux density with respect to positions of the lower magnet 407a (shown in FIG. 7A), and a curve Bf represents variation in magnetic flux density with respect to positions of the lower magnet 920 (shown in FIG. 7B).

As can be seen in FIG. 8, an area Lh of the curve Bh in which the variation in the magnetic flux density have linearity is much wider than an area Lf of the curve Bf in which the variation in the magnetic flux density have linearity. Namely, using the lower magnet 407a makes it possible to obtain a long position detecting stroke. In the present embodiment, the area Cl of the concave portion is wider than the area Lh. In other words, the area Cl of the concave portion can be determined according to a desired position detecting stroke.

As described above, in the present embodiment, as for the first upper magnet unit 4031 and the lower magnet 407a, the lower magnet 407a placed closer to the position detector 202a has the concave portion in the central part. This widens a position detecting stroke. Moreover, as with the first embodiment, using the first upper magnet unit 4031 which is flat-shaped and has no concave portion ensures large driving thrust.

Third Embodiment

An image blur correction apparatus according to a third embodiment differs from the image blur correction apparatus 14 according to the second embodiment only in the structure of lower magnets used for a lower magnet group. Therefore, in the following description, component elements corresponding to those of the second embodiment are denoted by the same reference symbols, and a description will be given of only differences from the second embodiment.

Figure 9:
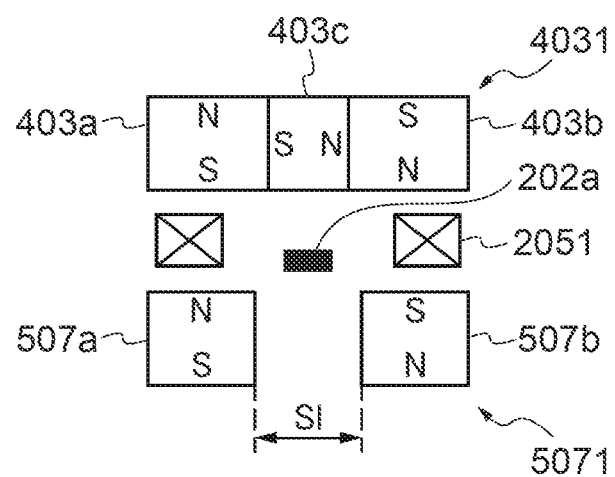
FIG. 9 is a view showing in a simplified manner a driving part in an image blur correction apparatus according to a third embodiment.

FIG. 9 is a view showing the arrangement of the first upper magnet unit 4031 and a first lower magnet unit 5071 in the image blur correction apparatus according to the third embodiment as with FIG. 6. It should be noted that also in the present embodiment, the image blur correction apparatus has three driving units. In FIG. 9, a driving part comprised of the first upper magnet unit 4031, the first lower magnet unit 5071, and the first coil 2051 is illustrated as a typical example, and illustration and description of the other driving units are omitted.

The first lower magnet unit 5071 has lower magnets 507a and 507b. The position detector 202a mounted on the FPC 201 (not shown in FIG. 9) placed on the first lower magnet 507 side of the first coil 2051 detects a position of the movable frame 206 by detecting a change in magnetic flux of the lower magnets 507a and 507b. The position detector 202a is placed at a location closer to the first lower magnet unit 5071 than to the first upper magnet unit 4031. The upper yoke 101 (not shown in FIG. 9), the first upper magnet unit 4031, the first lower magnet unit 5071, and the lower yoke 108 (not shown in FIG. 9) form a magnetic circuit which is a closed magnetic path.

Magnetization directions of the lower magnets 507a and 507b in the direction of the optical axis are the same as the respective magnetization directions of the upper magnets 403a and 403b, which face the lower magnets 507a and 507b, in the direction of the optical axis. In the direction perpendicular to the optical axis, a clearance is provided between the lower magnets 507a and 507b, and the first lower magnet unit 5071 can be considered to have a concave portion between the lower magnets 507a and 507b.

It should be noted that in the direction perpendicular to the optical axis, the lower magnets 507a and 507b have only to be placed apart from each other, and hence a non-ferromagnetic (nonmagnetic or feebly magnetic) spacer may be sandwiched between the lower magnets 507a and 507b instead of the clearance. In this case, an area where the magnetic flux density varies linearly can be widened even if surfaces of the lower magnets 507a and 507b and the spacer on the position detector 202a side are made flat. This is because in this arrangement, the first lower magnet unit 5071 can be considered to have a concave portion in the central part of the surface facing the position detector 202a. There is a relationship "Sl>L" where a width of the clearance between the lower magnets 507a and 507b is "Sl", and a stroke in which an output signal from the position detector 202a displays linearity is "L".

Figure 10A:
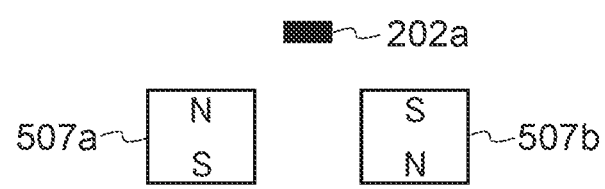
FIGS. 10A and 10B are views useful in explaining a positional relationship between a position detector and a lower magnet in the image blur correction apparatus according to the third embodiment.
Figure 10B:
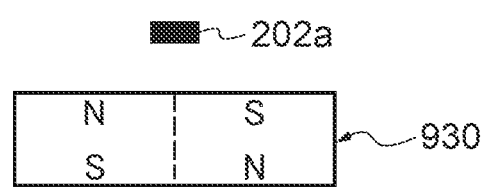

FIG. 10A is a view useful in explaining a positional relationship between the position detector 202a and the first lower magnet unit 5071. FIG. 10B shows an arrangement in which a magnet 930 according to a comparative example is used in place of the first lower magnet unit 5071. The magnet 930 does not have the clearance which the first lower magnet unit 5071 has. FIG. 11 is a graph useful in explaining how magnetic flux densities detected by the position detector 202a vary with magnet positions. A curve Bs in FIG. 11 represents variation in magnetic flux density with respect to positions of the first lower magnet unit 5071 (shown in FIG. 10A), and a curve Bf in FIG. 11 represents variation in magnetic flux density with respect to positions of the magnet 930 (shown in FIG. 10B).

As can be seen in FIG. 11, an area Ls of the curve Bh in which the variation in the magnetic flux density have linearity is much wider than an area Lf of the curve Bf in which the variation in the magnetic flux density have linearity. Namely, using the first lower magnet unit 5071 makes it possible to obtain a wide position detecting stroke. In the present embodiment, the width Sl of the clearance is wider than the area Ls. In other words, the width Sl of the clearance can be determined according to a desired position detecting stroke.

As described above, in the present embodiment, as for the first upper magnet unit 4031 and the first lower magnet unit 5071, the first lower magnet unit 5071 placed closer to the position detector 202a has a clearance in the central part. This widens a position detecting stroke. Moreover, as with the first embodiment, using the first upper magnet unit 4031 which is flat-shaped and has no concave portion ensures large driving thrust.

The embodiments described above are merely examples, and they can be used in combination as appropriate.

Figure 12A:
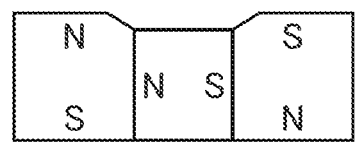
FIGS. 12A to 12C are views showing examples of magnets that have a concave portion.
Figure 12B:
Figure 12C:
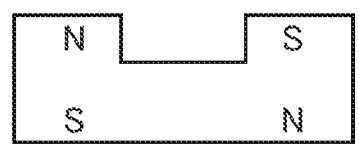
Figure 13:
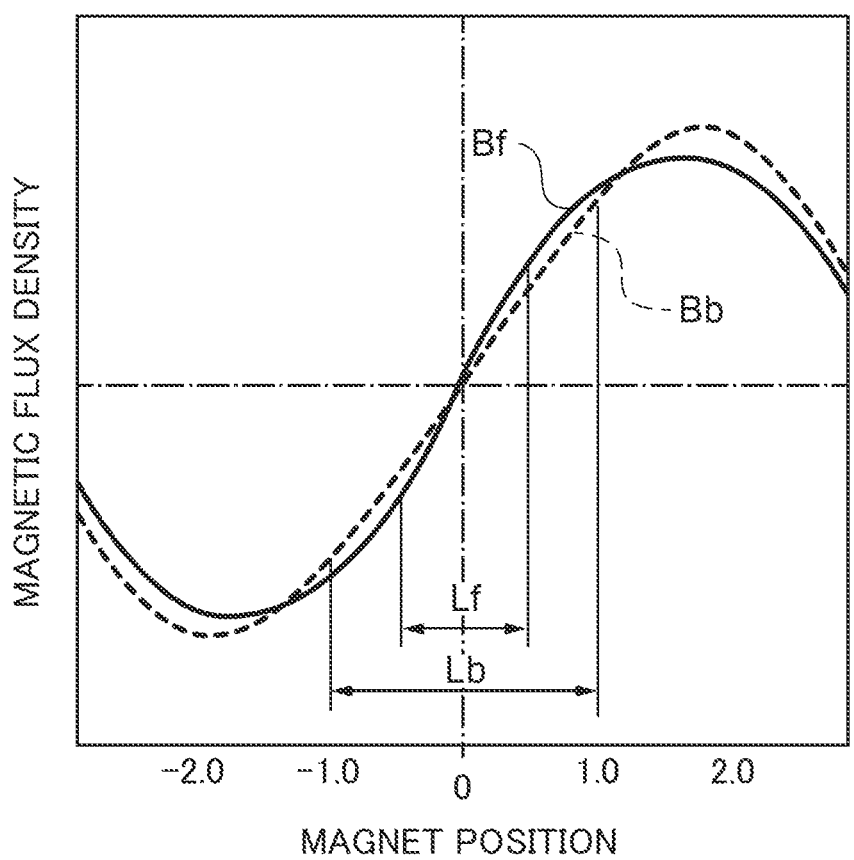
FIG. 13 is a graph useful in explaining a relationship between magnet positions and magnetic flux densities in a conventional arrangement.

For example, magnets or magnet units with a concave portion are not limited to the arrangements used in the embodiments described above. FIGS. 12A to 12C are views showing further examples of magnets that have concave portions, and these magnets or magnet units may be used. It should be noted that the magnet unit in FIG. 12A has a trapezoidal concave portion in a central part, the magnet unit in FIG. 12B has a triangular concave portion in a central part, and the magnet in FIG. 12C has a rectangular concave portion in a central part. Moreover, although in the embodiment described above, one comprised of three magnets using a part of a Halbach array is used, this is not limitative.

Furthermore, although in the embodiment described above, the upper magnet group in one image blur correction apparatus is comprised of magnets with the same structure and the lower magnet group is comprised of magnets with the same structure, alternatively the upper magnet group in one image blur correction apparatus may be comprised of magnets with different structures and the lower magnet group may be comprised of magnets with different structures. For example, the arrangements may be combined in various ways; for example, one of three driving units may have the arrangement of the second embodiment, and the other two driving units may have the arrangement of the first embodiment.

Although the image blur correction apparatus according to the embodiment described above corrects for image blur by driving the image pickup device 6 in a direction substantially parallel to the image forming surface, an image blur correction lens may be used as a substitute for the image pickup device 6 and driven in the direction substantially perpendicular to the imaging optical axis. In this case, the image blur correction apparatus is placed inside the interchangeable lens 2. The driving apparatus according to the present embodiment have only to be configured such that a magnet is placed in one of the movable member and the fixed member, and a position detector and a coil are placed in the other one of the movable member and the fixed member. Thus, although in the embodiment described above, the position detector and the coil are placed in the movable member and the magnet is placed in the fixed member, alternatively the position detector and the coil may be placed in the fixed member and the magnet may be placed in the movable member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-076275, filed Apr. 11, 2018, which is hereby incorporated by reference herein in its entirety.

What is claimed is:
1. A driving apparatus comprising:
a fixed member;
a movable member;
a coil;
a position detector configured to output a signal corresponding to a change in magnetic flux density and to detect a position of the movable member; and
a first magnet unit and a second magnet unit configured to be placed with the coil interposed therebetween,
wherein the position detector and the coil are placed on one of the fixed member and the movable member, and the first magnet unit and the second magnet unit are placed on the other one of the fixed member and the movable member,
the second magnet unit has a concave portion in a central part of a surface of the second magnet unit facing the position detector, and a surface of the first magnet unit facing the position detector is without the concave portion in a central part of the surface of the first magnet unit, and the position detector is placed closer to the second magnet unit than to the first magnet unit.

2. The driving apparatus according to claim 1, wherein the surface of the first magnet unit facing the position detector is flat.

3. The driving apparatus according to claim 1, wherein the second magnet unit has an arrangement in which three magnets are placed side by side in one direction, and
a height of a central magnet among the three magnets is lower than heights of magnets at both ends of the three magnets to form the concave portion.

4. The driving apparatus according to claim 1, wherein the second magnet unit has an arrangement in which three magnets are placed side by side in one direction, and
a magnetization direction of a central magnet among the three magnets crosses magnetization directions of magnets at both ends of the three magnets.

5. The driving apparatus according to claim 1, wherein the concave portion of the second magnet unit has an arc shape, a trapezoidal shape, a triangular shape, or a rectangular shape.

6. The driving apparatus according to claim 1, wherein the second magnet unit has two magnets, and the two magnets are placed apart from each other to form the concave portion.

7. The driving apparatus according to claim 6, wherein a clearance or a spacer that is not ferromagnetic is provided between the two magnets.

8. The driving apparatus according to claim 1, wherein the position detector is placed inside a winding of the coil.

9. The driving apparatus according to claim 1, wherein the position detector is a Hall effect device.

10. The driving apparatus according to claim 1, wherein the first magnet unit has an arrangement in which three magnets are place side by side in one direction, and
a magnetization direction of a central magnet among the three magnets crosses magnetization directions of magnets at both ends of the three magnets.

11. The driving apparatus according to claim 1, wherein the position detector and the coil are placed on the fixed member.

12. The driving apparatus according to claim 1, wherein the position detector is placed closer to the second magnet unit than to the first magnet unit in a direction in which the first magnet unit and the second magnet unit sandwich the coil.

13. An image blur correction apparatus comprising:
a driving apparatus comprising a fixed member, a movable member, a coil, a position detector configured to output a signal corresponding to a change in magnetic flux density and to detect a position of the movable member, and a first magnet unit and a second magnet unit placed with the coil interposed therebetween; and
a lens that is held by the movable member,
wherein the movable member is movable in a direction substantially perpendicular to an optical axis of the lens,
the position detector and the coil are placed on one of the fixed member and the movable member, and the first magnet unit and the second magnet unit are placed on the other one of the fixed member and the movable member;
the second magnet unit has a concave portion in a central part of a surface of the second magnet unit facing the position detector, and a surface of the first magnet unit facing the position detector is without the concave portion in a central part of the surface of the first magnet unit, and the position detector is placed closer to the second magnet unit than to the first magnet unit.

14. An image blur correction apparatus comprising:
a driving apparatus comprising a fixed member, a movable member, a coil, a position detector configured to output a signal corresponding to a change in magnetic flux density and to detect a position of the movable member, and a first magnet unit and a second magnet unit placed with the coil interposed therebetween; and
an image pickup device that is held by the movable member,
wherein the movable member is movable in a direction substantially parallel to an image forming surface of the image pickup device,
the position detector and the coil are placed on one of the fixed member and the movable member, and the first magnet unit and the second magnet unit are placed on the other one of the fixed member and the movable member;
the second magnet unit has a concave portion in a central part of a surface of the second magnet unit facing the position detector, and a surface of the first magnet unit facing the position detector is without the concave portion in a central part of the surface of the first magnet unit, and
the position detector is placed closer to the second magnet unit than to the first magnet unit.

15. An image pickup apparatus equipped with an image blur correction apparatus, the image blur correction apparatus comprising:
a driving apparatus comprising a fixed member, a movable member, a coil, a position detector configured to output a signal corresponding to a change in magnetic flux density and to detect a position of the movable member, and a first magnet unit and a second magnet unit placed with the coil interposed therebetween; and
a lens that is held by the movable member,
wherein the movable member is movable in a direction substantially perpendicular to an optical axis of the lens,
the position detector and the coil are placed on one of the fixed member and the movable member, and the first magnet unit and the second magnet unit are placed on the other one of the fixed member and the movable member;
the second magnet unit has a concave portion in a central part of a surface of the second magnet unit facing the position detector, and a surface of the first magnet unit facing the position detector is without the concave portion in a central part of the surface of the first magnet unit, and
the position detector is placed closer to the second magnet unit than to the first magnet unit.

16. An image pickup apparatus equipped with an image blur correction apparatus, the image blur correction apparatus comprising:
a driving apparatus comprising a fixed member, a movable member, a coil, a position detector configured to output a signal corresponding to a change in magnetic flux density and to detect a position of the movable member, and a first magnet unit and a second magnet unit placed with the coil interposed therebetween; and an image pickup device that is held by the movable member, wherein the movable member is movable in a direction substantially parallel to an image forming surface of the image pickup device, the position detector and the coil are placed on one of the fixed member and the movable member, and the first magnet unit and the second magnet unit are placed on the other one of the fixed member and the movable member;

the second magnet unit has a concave portion in a central part of a surface of the second magnet unit facing the position detector, and a surface of the first magnet unit facing the position detector is without the concave portion in a central part of the surface of the first magnet unit, and the position detector is placed closer to the second magnet unit than to the first magnet unit.

* * * * *